United States Patent
Le Scouarnec et al.

(10) Patent No.: US 10,389,701 B2
(45) Date of Patent: Aug. 20, 2019

(54) METHOD AND DEVICE FOR SECURELY ACCESSING A WEB SERVICE

(71) Applicant: THOMSON LICENSING, Issy de Moulineaux (FR)

(72) Inventors: Nicolas Le Scouarnec, Liffre (FR); Erwan Le Merrer, Rennes (FR); Gilles Straub, Acigne (FR)

(73) Assignee: InterDigital CE Patent Holdings, Paris (FR)

( * ) Notice: Subject to any disclaimer, the term of this patent is extended or adjusted under 35 U.S.C. 154(b) by 36 days.

(21) Appl. No.: 14/428,835

(22) PCT Filed: Sep. 16, 2013

(86) PCT No.: PCT/EP2013/069178
§ 371 (c)(1),
(2) Date: Mar. 17, 2015

(87) PCT Pub. No.: WO2014/044641
PCT Pub. Date: Mar. 27, 2014

(65) Prior Publication Data
US 2015/0222627 A1 Aug. 6, 2015

(30) Foreign Application Priority Data
Sep. 18, 2012 (EP) .................................. 12306126

(51) Int. Cl.
*G06F 7/04* (2006.01)
*H04L 29/06* (2006.01)
(Continued)

(52) U.S. Cl.
CPC ........ *H04L 63/0823* (2013.01); *H04L 61/305* (2013.01); *H04L 63/126* (2013.01);
(Continued)

(58) Field of Classification Search
None
See application file for complete search history.

(56) References Cited

U.S. PATENT DOCUMENTS

| | | |
|---|---|---|
| 7,181,506 B1 | 2/2007 | Vigue et al. |
| 7,424,608 B1 | 9/2008 | Cherukumudi et al. |

(Continued)

FOREIGN PATENT DOCUMENTS

| | | |
|---|---|---|
| CN | 102026192 | 4/2011 |
| JP | 2008017055 | 1/2008 |

(Continued)

OTHER PUBLICATIONS

Valancius et al: "Greening the internet with nano data centers", In CoNext (2009), Dec. 1-4, 2009, Rome, Italy; pp. 37-48.
(Continued)

*Primary Examiner* — Samson B Lemma
(74) *Attorney, Agent, or Firm* — Myers Wolin LLC

(57) ABSTRACT

An apparatus and method for securely accessing a web service by a web application running in a browser on a user device is disclosed. A user device sends a request for accessing a web service by addressing a generic name. In response, the user device receives a global name that uniquely identifies a local device hosting a web service. The global name is further associated with a certificate. The user device receives the global name and verifies the certificate associated with the global name to securely access the web service.

21 Claims, 4 Drawing Sheets

(51) Int. Cl.
H04L 29/08 (2006.01)
H04L 29/12 (2006.01)
H04W 36/22 (2009.01)

(52) U.S. Cl.
CPC .......... *H04L 67/02* (2013.01); *H04L 67/2814* (2013.01); *H04L 61/1511* (2013.01); *H04W 36/22* (2013.01)

(56) References Cited

U.S. PATENT DOCUMENTS

| | | | |
|---|---|---|---|
| 8,185,945 | B1 | 5/2012 | Eatough et al. |
| 2002/0046045 | A1* | 4/2002 | Narin ..................... G06Q 20/04 |
| | | | 705/26.1 |
| 2003/0233551 | A1* | 12/2003 | Kouznetsov ...... G06F 17/30209 |
| | | | 713/175 |
| 2007/0112814 | A1* | 5/2007 | Cheshire ........... G06F 17/30876 |
| 2008/0281699 | A1* | 11/2008 | Whitehead ............. G06Q 30/02 |
| | | | 705/14.41 |
| 2009/0158031 | A1 | 6/2009 | Wan et al. |
| 2012/0149463 | A1 | 6/2012 | Jabara et al. |
| 2012/0151213 | A1 | 6/2012 | Xiao |

FOREIGN PATENT DOCUMENTS

| | | |
|---|---|---|
| WO | WO2006115479 | 11/2006 |
| WO | WO2011098660 | 8/2011 |

OTHER PUBLICATIONS

W3C Working Draft: "cross origin resource sharing", http://www.w3.org/TR/cors/; Apr. 3, 2012; pp. 1-21.
W3C Working DRAFT_XML http request level2, http://www.w3.org/TR/XMLHttpRequest2/; Jan. 17, 2012; pp. 1-18.
Fonera 2.0n http://corp.fon/com/en/products/fonera2n/features/full-wifi/; "Torrent Downloading, uploading, hard-drive sharing"; YouTube website; pp. 1-3; Feb. 3, 2015.
Foursquare 101; "Badges, news and app—get a discount", http://aboutfoursquare.com/foursquare-101/; pp. 1-2; Feb. 3, 2015.
Handa: "Mobile data offload for 3G networks", a white paper; Oct. 2009; IntelliNet Technologies; pp. 1-7.
LaCIE CLOUDBOX: http://cloudbox.lacie.com/; "Access for Family, Sharing with Friends"; website; p. 1; Feb. 3, 2015.
Synology Inc. Network Attached Storage Newnas Experience; DSM 4.2 Packages: http://www.synology.com/dsm/dsm_app.php; pp. 1-5; Feb. 24, 2015.
Transmission—ISA Cross-platform BitTorrent Client; http://www.transmissionbt.com/about/; website; pp. 1-2; Feb. 24, 2015.
UbiSTORAGE NOEBOX: http://www.ubistorage.com/; website; Feb. 24, 2015.
Stanford Javascript Crypto Library website: https://crypto.stanford.edu/sjcl/; p. 1; Feb. 24, 2015.
AT&T WiFi: http://www.att.com/gen/general?pid=5949;website; "ATT&T Smart WiFi App., Plans, and Hotspot Locations", p. 1, Feb. 2, 2015.
Balasubramanian et al: "Augmenting mobile 3G using WiFi", MobiSys'10: Proc. of the 8th ACM International conference on Mobile Systems, applications, and services, pp. 209-222, Jun. 15-18, 2010.
"Burstable Billing" from Wikipedia; http://en.wikipedia.org/wiki/Burstable_billing.
Fon: website; "Gramofani WiFi Music Player"; http://www.fon.com; pp. 1-3; Feb. 24, 2015.
Haverinen et al: "Extensible authentication protocol method for global system for GSM subscriber identity modules (EAP-SIM)", Jan. 2006; Cisco Systems; pp. 1-81.
Lee et al: "Mobile data offloading: how much can wifi deliver?", IEEE/ACM Transactions on Networking, vol. 21, No. 2, Apr. 2013; pp. 536-551.

Ristanovic et al: "Energy Efficient Offloading of 3G Networks", 2011 Eighth IEEE International Conference on Mobile Ad-Hoc and Sensor Systems, pp. 202-211, 2011.
Swisscom Public Wireless LAN: "Enjoy Fast Wireless Surfing in the Swisscom Public WLAN"; http://www;swisscom.ch/en/residential/internet/internet-on-the-move/pwlan.html; pp. 1-2; Feb. 24, 2015.
W3C Last Call Working Draft; Web Cryptography API, http://www.w3.org/TR:WebCryptoAPI, Jun. 2013; Mar. 25, 2014; pp. 1-85.
Huguenin et al: "Hoop offloading HTTP posts from user device onto residential gateways", Technicolor Technical report, 2013. Available: http://hal.archives-ouvertes.fr/hal-00873774; pp. 1-13; Jan. 1, 2013.
Bao et al: "Data Spotting: Exploiting naturally clustered mobile devices to offload cellular traffic", 2013 Proceedings IEEE Infocom; pp. 420-424.
Dong et al: "iDEAL Incentivized dynamic cellular offloading via auctions", 2013 Proceedings IEEE Infocom; pp. 755-763.
Facebook Wifi, https://www.facebook.com/help/fabebookwifi,pp. 1-2.
Go et al: "A disruption tolerant transmission protocol for practical mobile data offloading", MobiOpp'12, Mar. 15-16, 2012, Zürich, Switzerland; pp. 1-8.
Guidec et al: "Biomedical monitoring of non hospitalized subjects using disruption tolerant wireless sensors", MobiHealth'12: Proc of the 3rd conf. on wireless mobile communication and hearthcare, vol. 61, 2012, pp. 11-19.
Han et al: "On accelerating content delivery in mobile networks", IEEE Communications Surveys & Tutorials, vol. 15, No. 3, Third Quarter 2013, pp. 1314-1333.
Huang et al: "A close examination of performance and power characteristics of 4G LTE networks", MobiSys'12, Jun. 25-29, 2012, Low Wood Bay, Lake District, UK, pp. 225-238.
Kim et al: "An analytical framework to characterize the efficiency and delay in a mobile data offloading system", MobiHoc'14, Aug. 11-14, 2014, Philadelphia, PA, USA; pp. 1-10.
Krifa et al: "Optimal buffer management policies for delay tolerant networks", SECON'08: Proc of 5th annual IEEE communications society conference on sensor, Mesh and Ad hoc communications and networks, 2008, pp. 260-268.
OECD: "OECD broadband portal", http://www.oecd.org/sti/broadband/oecdbroadbandportal.htm; pp. 1-3.
Paris et al: "A bandwidth trading marketplace for mobile data offloading", Infocom'13, 2013, pp. 430-434.
You Tube API v2.0; "resumable uploads", http://developer.google.com/youtube/2.0/developers_guide_protocol_resumable_uploads; pp. 1-6; Feb. 24, 2015.
Zhuo et al: "An incentive framework for cellular traffic offloading", IEEE Transactions on Mobile Computing, vol. 13, No. 3, Mar. 2014; pp. 541-555.
Huguenin et al: "Hoops_offloading HTTP(S) POSTs from User Device onto Residential Gateways", ICWS 2014; pp. 1-8.
Huguenin et al: "Hoop: Offloading HTTP(S) POSTs from user devices onto residential gateways" presented to WWW2014 (rejected); pp. 1-11.
Huguenin et al: "Efficient and transparent wifi offloading for HTTP(S) POSTs", presented in IEEE transactions on mobile computing, waiting for reviews; pp. 1-14; Jan. 1, 2014.
Le Merrer et al: "HOOP HTTP POST offloading", Presented NSDI 2013 (Rejected); pp. 1-13; Jan. 1, 2013.
Agarwal et al: "Somniloquy augmenting network interfaces to reduce PC energy usage", In NSDI (2009), 6th Usenix Symposium on Networked Systems Design and Implementation; pp. 365-380.
"Amazon Silk on Kindle Fire" website, http://www.amazon.com/gp/help/customer/display.html?nodeId=200729650; pp. 1-3; Feb. 24, 2015.
Arm: "bigLITTLE Techology"; website , http://www.arm.com/products/; pp. 1-2; Feb. 24, 2015.
Chun et al: "CloneCloud elastic execution between mobile device and cloud", In EuroSys'11, Apr. 10-13, 2011, Salzburg, Austria; pp. 1-14.
Crypto JS: :JavaScript Implementations of standard and secure cryptographic algorithm, website, https://code.google.com/p/crypto-js/; pp. 1-5; Feb. 24, 2015.

(56) References Cited

OTHER PUBLICATIONS

Defrance et al: "Efficient peer to peer backup services through buffering at the edge", IEEE P2P 2011 proceedings; pp. 142-151.
Dischinger et al: "Characterizing Residential Broadband Networks", in IMC Oct. 24-26, 2007; pp. 1-14.
Facebook: "A continuted commitment to security", http://www.facebook.com/blog.php?post=486790652130; pp. 1-2; Feb. 24, 2015.
Fielding et al: "Hypertext transfer protocol", IETF Network Working Group, http://tools.ietf.org/html/rfc2616, Jun. 1999; pp. 1-114.
Gallery Open Source Web Based Photo Album Organizer, http://gallery.menalto.com; pp. 1-4; Feb. 24, 2015.
Gass et al: 3"Eliminating backhaul bottlenecks for opportunistically encounered wifi hotspots", In VTC (2010); pp. 1-5.
Google: "making search more secure", http://googleblog.blogspot.com/2011/10/making-search-more-secure.html; pp. 1-7; Oct. 18, 2011.
Laoutaris et al: "delay tolerant bulk data transfers on the internet", SIGMETRICS/Performance'09, Jun. 15-19, 2009, Seattle, WA, USA; pp. 229-238.
May et al : "Service hosting gateways a plateform for distributed service deployment in end user homes", SIGCOMM'11, Aug. 15-19, 2011, Toronto, Ontario, Canada; pp. 476-477.
Nedevschi et al: "Skilled in the art of being idle reducing energy waste in networked systems", NSDI '09: 6th Usenix Symposium on Networked Systems Design and Implementation, 2009; pp. 381-394.
Opera Mini, http://www.opera.com/mobile/specs/; "Frequently-Asked Questions for Opera for Anroid"; pp. 1-4; Feb. 24, 2015.
Reich et al: "Sleepless in Seattle No Longer", In Usenix ATC (2010); pp. 1-14.
ResourceSpace; "an open source digital assess management", http://www.resourcespace.org/; pp. 1-2.
Stapp et al: "The dynamic host configuration protocol client, Fully Qualified Domain Name (FQDN) Option", IETF RFC 4702, Oct. 2006; pp. 1-17.
Stark et al: "Symmetric Cryptography in javascript", in ACSAC (2009). http://crypto.stanford.edu/sjcl/; pp. 1-9.
Trestian et al: "Taming User-Generated Content in Mobile Networks via drop zones", In Infocom (2011); pp. 2840-2848.

* cited by examiner

METHOD AND DEVICE FOR SECURELY ACCESSING A WEB SERVICE

This application claims the benefit, under 35 U.S.C. § 365 of International Application PCT/EP2013/069178, filed Sept. 16, 2013, which was published in accordance with PCT Article 21(2) on Mar. 27, 2014 in English and which claims the benefit of European patent application No. 12306126.9, filed Sept. 18, 2012.

TECHNICAL FIELD

The present invention relates generally to the field of secure access to web service. More precisely, the invention relates to a method for securely accessing a web service by a browser running a web application on a user device through a network, wherein the web service is hosted by a local device.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Digital data (e.g., photos, videos) are increasingly produced and managed on mobiles devices (e.g., smartphones, tablets, laptops). This data is also often shared, backed up, or processed via Internet. Indeed, a wide range of "cloud" services handle users' content, be they photo processing services, social networks or online storage. Most of these cloud services rely entirely on web technologies. As a consequence, users need to upload large amounts of content over HTTP to web applications. However, the speed of uploads is limited by the available bandwidth. Indeed, the connectivity speed to the Internet remains limited due to the use of legacy infrastructures (xDSL), or of shared medium (Cellular).

The long upload times prevent users from standing by or powering off their stand-alone devices and require these users to keep their devices connected to handle the transfer over the Internet. In order to alleviate these issues, a mechanism to offload uploads over HTTP to a third party device which is permanently connected to the network, such as residential gateway, is proposed. A method for locating the third party device offering the offloading web service is therefore proposed.

However, offloading a task to a third party requires to trust this third party, in other words the third party device hosting the offload service has to be authenticated by the user stand/alone device. Known solution for authenticating a device or a web service are based on certification by a trust authority. Certificates are either delivered by a trust authority to a trusted operator owning the web service or to user's physical device. However, these solutions are not compatible with the legacy software, such as web browser, and standard web protocols wherein the processing environment is limited. In others words, the browser is limited in term of inputs and outputs, for instance the browser cannot access to the storage media (such as hard disk drive) of the device on which it is executed, cannot access directly to the network.

A solution for securely accessing a web service by a browser running a web application on a user device through a network, wherein the web service is hosted by a local device is therefore required. The method should deliberately be simple to ease implementation and use, and compatible with legacy software, adapted to be implemented in JavaScript and to run in the browser.

The present invention provides such a solution.

SUMMARY OF INVENTION

In a first aspect, the invention is directed to a method for securely accessing a web service by a browser running a web application on a user device through a network. The web service is hosted by at least a device among which a local device is being accessed by the user device Advantageously, the local device is the device which hosts the web service and which is closest to the user device. The local device comprises a global name that uniquely identifies the local device and a certificate associated to the global name. the method further comprises a step of sending by the web application to the network a request for accessing the web service by addressing a generic name that identifies any device hosting the web service; a step of receiving from the network by the web application a response to the request comprising said global name identifying the local device hosting the web service; a step of verifying by the web application that the received global name is comprised in a list; and when the verification is successful, a step of connecting to the local device by addressing the global name; a step of receiving the certificate from the local device; a step of verifying the certificate associated to the global name by the browser and a step of securely accessing the web service. Advantageously a generic name is a name under which any local device is accessible, that is, is common to all devices hosting the web services. Advantageously the list, also called white list, comprises global names of devices being trusted for hosting the web service. Advantageously, the list does not comprises an exhaustive list of global names of local devices being trusted for hosting the web service, since the number of global names could be huge, but patterns for matching global names of local devices.

According to an advantageous characteristic the local device is delivered a global name and a certificate associated to the global name by a trusted operator.

According to another advantageous characteristic, the white list is dynamically obtained from a trusted operator by the web application running in the browser. In a variant, the white list is hard coded in the web application running in the browser.

In a first preferred embodiment, the request for accessing the web service by addressing a generic name is a HTTP request and a request for securely accessing the web service by addressing the global name is a HTTPS request including a SSL request.

According to variant the local device is a gateway device, a set top box, a Network Attached Storage (a NAS).

In a second aspect, the invention is directed to a user device for securely accessing a web service by a browser running a web application through a network. The web service is hosted by at least a device among which a local device is being accessed by the user device. Advantageously, the local device is the device which hosts the web service and which is closest to the user device. The device comprises means for sending by the web application to the network a request for accessing the web service by addressing a generic name that identifies any devices hosting the web service; means for receiving from the network by the web application a response to the request comprising a global name uniquely identifying the local device hosting the web service; means for verifying by the web application that the received global name is comprised in a list, also called white list, wherein the list comprises global names of local devices being trusted for hosting the web service; and means for connecting by the web application to the local device by addressing the global name; means for receiving a certificate from the local device and means for verifying the certificate associated to the global name and means for securely accessing the web service.

Any characteristic or embodiment described for the method for securely accessing a web service through a network by a browser running a web application on a user device, wherein the web service is hosted by a local device is compatible with the user device or the local device adapted to implement the disclosed method.

The method according to a first embodiment is advantageously compatible with current software and standard web protocols. Hence, it can be deployed without requiring changes to the users' browsers or to the protocols used.

BRIEF DESCRIPTION OF DRAWINGS

Preferred features of the present invention will now be described, by way of non-limiting example, with reference to the accompanying drawings, in which.

DESCRIPTION OF EMBODIMENTS

Figure 1:
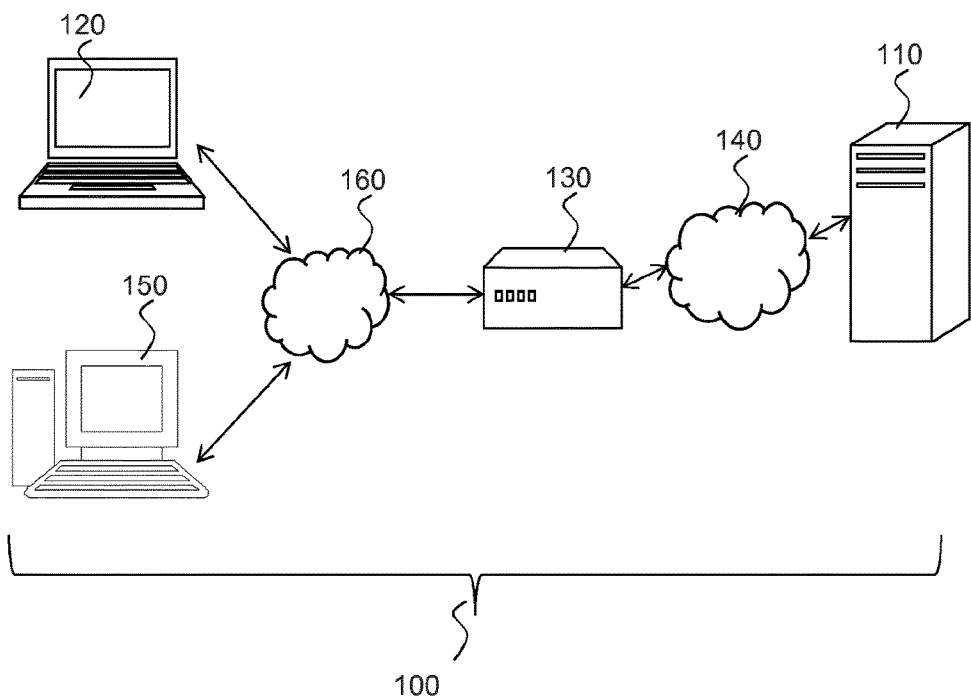
FIG. 1 illustrates an exemplary network in which the present invention may be used.

FIG. 1 illustrates an exemplary network 100 in which the present invention may be used. The network 100 comprises a server device 110 hosting a web application, such as a photo sharing application. A user owns personal devices 120, such as battery powered devices (tablet, laptop computer, mobile phone) or computers, on which a web browser is available. The client part of a web application, for instance a photo sharing application, is executed on the browser of a user device 120 and the web application accesses the server part of the web application. The client part of the web application can also access the web service, such as an offloading service. The user device connects to the web service running on a local device such as an Internet router, a set top box, another user computer, a residential gateway, a NAS 150 by the local area network 160. The client part of the web application, and the web service can access the server part of the web application through a network access device 130 such as a wireless Internet router or residential gateway. Thus the residential gateway is at the frontier between a fast local area network 160 and a relatively slow broadband network 140 wherein the access to the slow broadband network is an issue for uploading data to the server part of the web application. In a preferred embodiment, the network access device 130 is the local device since a network access device is always powered-up. In a variant, wherein for instance such network access device 130 does not support the offloading function, the local device is any type of device of the local network 140 preferably of type always-on as above detailed, for instance a NAS 150. The invention provides a solution for authenticating the local device 130, 150 or more precisely the web service running on the local device 130, 150 so that the uploaded data temporarily transiting in the local device are protected from attackers by avoiding attackers to impersonate the local device.

A salient inventive idea of the present invention is to locate, from the browser, a local web service to be used within a web application, and to authenticate the local service. The method can be used to locate an offloading service, but it advantageously compatible with other application such as locating a Web to DLNA/UPNP relay wherein a web application is authorized to control through a web service to DLNA/UPNP relay, users' devices.

In a preferred embodiment, the method is adapted to be executed by JavaScript language. Hence the method is advantageously adapted to fit into the constrained execution environment offered by the web browser. These constraints help the browser to ensure that any malicious code has a very limited power.

Besides, the method for securely accessing the web service dynamically determines both the existence of the service, and its address. The mechanism also takes care of authenticating re-located service. The mechanism also allows to implement dynamic adaptation of the client part of the web application depending on the existence of the service.

Figure 2:
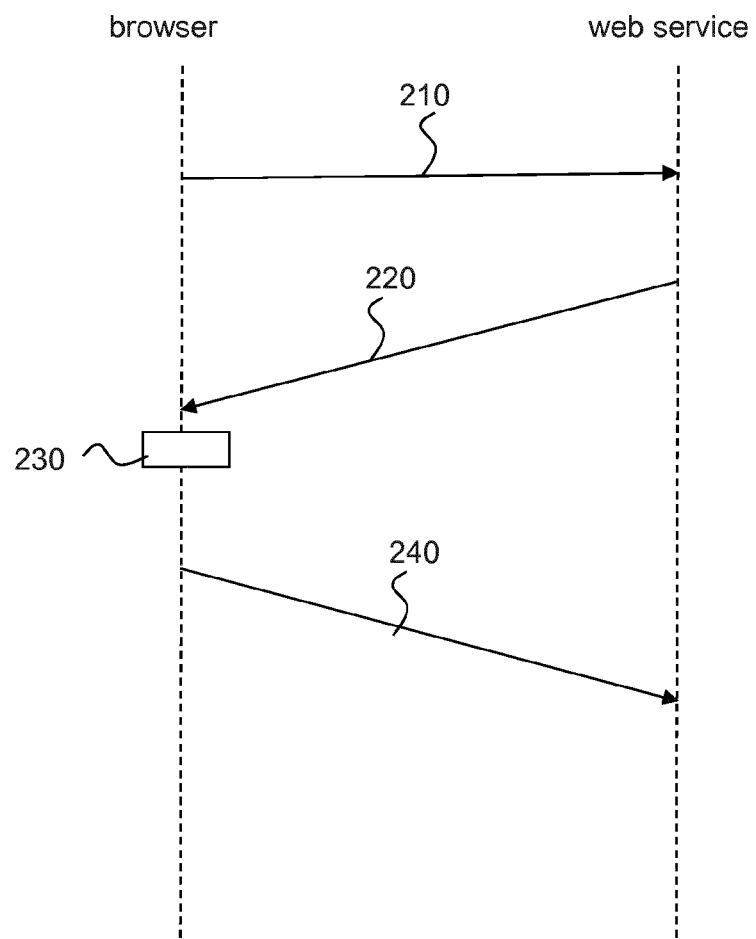
FIG. 2 illustrates the steps of the secure access method according to a first embodiment of the present invention.

FIG. 2 illustrates the steps of the secure accessing method according to a first embodiment of the present invention.

The browser can only access the network using XMLHttpReq implemented in a so-called browser network API. The browser further comprises a JavaScript machine. The authentication/certification mechanism present in the browser is the TLS/SSL mechanism.

In a preliminary step, not represented on FIG. 2, a trusted operator buys a domain (offload.org) and request for a SSL certificate for that domain. Each trusted devices running the service receives a unique name (for instance af34a), and a certificate (af34a.offload.org) corresponding to its name. The trusted operator runs a DNS service (available on the Internet), which trusted devices are able to update, so that the name af34a.offload.org always map to the right local IP address.

In a first step 210 of the location/authentication procedure, the browser trying to access a locally hosted web service sends a request to a generic name (offload.local) to the network. More precisely, the JavaScript issues, through the browser network API, a local query to some fixed address (offload.local) common to any device running the service on any local network. The DNS present in gateway will reply to the DNS query with a local IP address and the browser network API connects to this IP address, i.e; the IP address of the local device hosting the web service, using unsecure HTTP protocol. The issue consists in that it wouldn't be possible to get a certificate for "offload.local" since this name belongs to nobody, and no certification authority will deliver such a certificate.

Thus, in a second step 220 the browser obtains a fully qualified name (af34a.offload.org), called global name, for web service hosted by the local device and associated to the local device IP address. However, as already explained, the fully qualified name may be corrupted.

In a third step 230, the browser checks that the obtained global name (af34a.offload.org) is managed by some trusted operator. Indeed, while someone may have a valid certificate for hacker.org, this is not a sufficient condition. A further requirement is that the owner of the certificate is trusted.

Hence, the browser verifies the obtained global name against a white list, to be sure that the sub-certificate (af34a.offload.org) comes from a trusted operator (offload.org). The skill in the art will appreciate that the white list may not comprise an exhaustive list of the global name of each trusted devices but a pattern matching scheme used to verify the global name.

In a last step 240, when the verification succeeds, the browser sends a request for securely accessing the global name. More precisely, the browser network API performs a new query to the fully qualified name (af34a.offload.org). The DNS operated by the trusted operator answers with the local IP address. The browser connects in HTTPS to this local IP address and checks that the certificate associated to the global name corresponds to the device it connects to and that the certificate is valid and has not been revoked using the certificate collection of the browser. The step 240 advantageously allows that the local device is authenticated, and the step 230 advantageously allows that the local device was approved by the trusted operator.

Hence, the web service available at https://af34a.offload.org is safely and securely used.

Any failure at any step means that the service is either not available or that it cannot be trusted because of some authentication issues. Hence, it should not be used.

Figure 3:
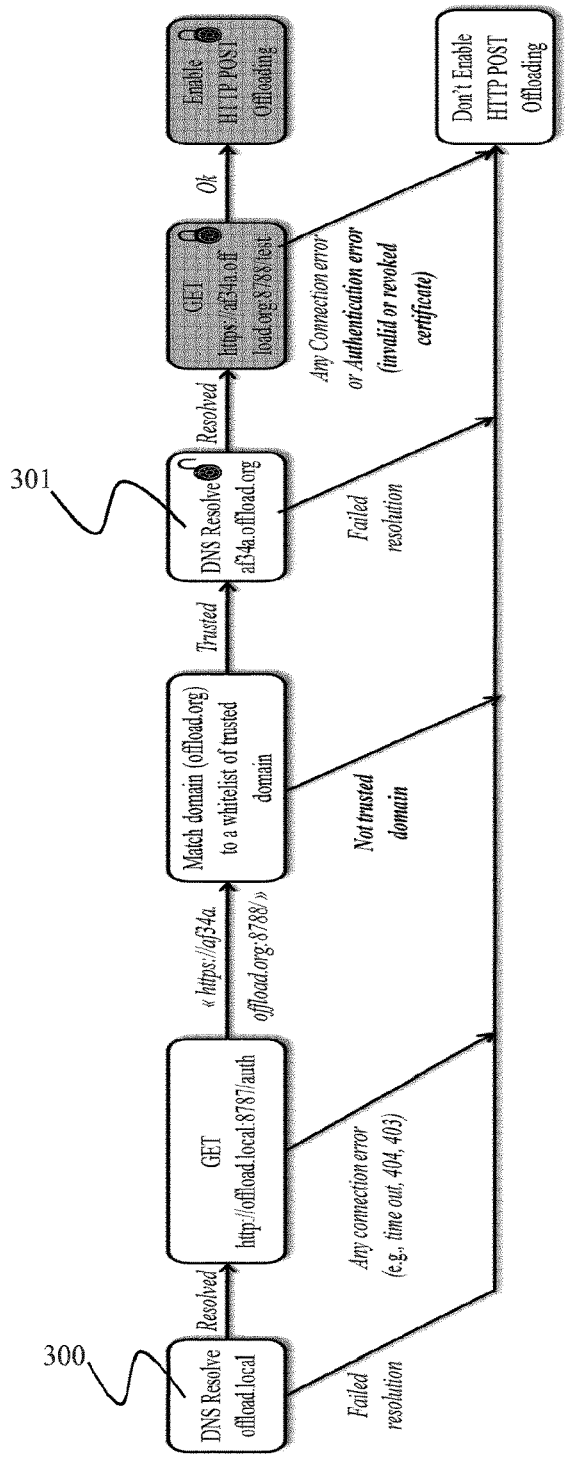
FIG. 3 illustrates the steps of the secure access method according to a preferred embodiment of the present invention.

FIG. 3 illustrates the steps of the secure accessing according to a preferred embodiment of the present invention. As already explained, in the preferred embodiment the web service is a web service for offloading uploads.

The location service is available at a fixed URL http://offload.local/test. For the sake of clarity, we omit the port number in the whole description. However, in order to avoid conflicts with existing services, we use non-standard HTTP/HTTPS ports (e.g., 8787 for HTTP and 8788 for HTTPS). The fully qualified name and the port are fixed and common to all gateways. As a consequence, the web application running in the browser, which can access the network only using XMLHttpRequest, can access the service. The browser resolves the generic fully qualified name (offload.local 300) to the IP address of the gateway and connects to it. Any connection error (failed DNS resolution, connection timeout, 404, 403 . . .) indicates that the service is not available. If the offloading service is running and can accept offload requests, the browser will receive OK as an answer.

The location service relies heavily on the DNS to resolve a fixed name to the IP address of the device supporting the service on the LAN. Most gateways run their own DNS server, and can hence register as offload.local on their own. If offloading service is offered by another device, this device can still register the name offload.local in the DNS of the gateway thanks to the DHCP protocol. Since the DNS resolution may be easily affected by anyone on the same LAN registering for offload.local using DHCP, the web developer may be willing to ensure that the resolution leads to a trusted (according to the browser's SSL certificates) gateway. The solution is to rely on the HTTPS authentication mechanism. To this end, each gateway has its own self-signed certificate, and the user manually adds certificates from gateways he trusts to his browser's certificate list. Requests are sent to https://offload.local/instead of http://offload.local/. If the gateway is not trusted, requests to the location service will result in connection errors. Hence, the offloading won't be enabled.

However, this process requires the user to manually approve each new gateways he uses by adding the appropriate certificate in his browser. This process may be tricky and inhibit a fully transparent user's experience.

To make the process seamless, the method according to a preferred embodiment, advantageously provides an enhanced location method that also takes care of authenticating the gateway. The method is meant to be used with embedded devices running trusted software and whose certificate cannot be copied. FIG. 3 illustrates the whole location and authentication process. This process enhances the non-authenticated location service described here before. In this case, each gateway is associated with a unique name (for instance af34a.offload.org 301), and has the corresponding certificate signed by a trusted authentication authority. Each gateway publishes its local IP address onto a dynamic DNS service running for the trusted domain offload.org.

The process now consists in locating the gateway and then authenticating it. To this end, a request to http://offload.local/auth is issued. This request returns the unique fully qualified name (e.g., af34a.offload.org 301) for the gateway. This fully qualified name is matched with a white-list of domains to ensure that the certificate has been issued by a proper authentication authority: not all valid SSL domain (i.e., approved according to the browser certificate list) map to trusted gateways. Only a few domains (e.g., offload.org) are trusted for this purpose and as such are listed in the white-list. Up to this point, the gateway is not trusted and information obtained may have been manipulated. However, the fully qualified name maps to a trusted set of gateways. Next, a request to https://af34a.offload.org/test is issued. The browser checks the certificate of the gateway thus preventing any hijacking. If the certificate is legitimate, the offloading mechanism can be enabled and requests can be posted to https://af34a.offload.org/upload/.

Again, as in the basic location process, any error means that the offloading mechanism cannot be enabled. Since each device has its own certificate, it is possible to revoke individual certificates in case they are stolen, or in case a security issue is discovered on a subset of devices. At most, if an attacker succeeds in disrupting the location service by tampering with DNS entries, the web application will simply fall back onto the regular service without offloading capability, thus resulting in a no service disruption for the user apart from offloading being inactive.

The skilled person will also appreciate that as the method can be implemented quite easily without the need for special equipment, it may be implemented by 'normal' user devices such as PCs, mobile phones, gateways in home networks and so on. The invention is further compatible with 802.11 communication (Wi-Fi), or any wire or wireless access such as Bluetooth or UWB. The invention is advantageously compatible with a web service located on a hotspot of a wireless network.

Figure 4:
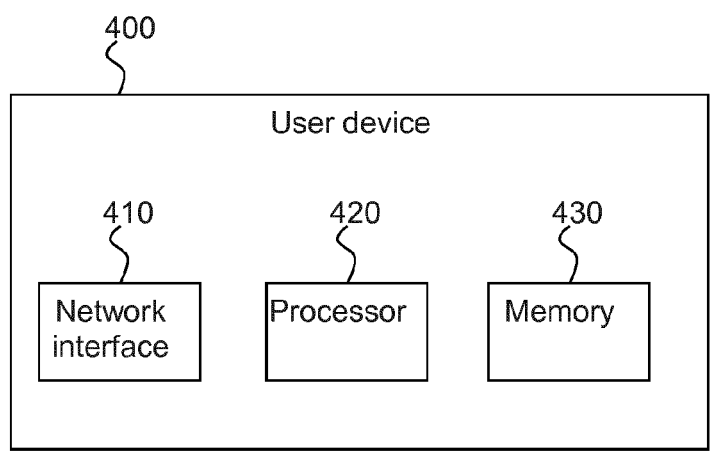
FIG. 4 illustrates a local device implementing the secure access method according to a preferred embodiment of the present invention.

FIG. 4 illustrates an exemplary user device according to a preferred embodiment of the present invention. The user device 400 comprises a software module called browser or web browser. The browser runs a web application trying to securely access a web service through the network. According to different variants, the user device may be implemented in a computer, a mobile device, a tablet.

The user device 400 comprises a network interface 410, such as a 802.11 wireless card, at least one processor 420 (hereinafter "processor") and memory 430. The network interface 410 is adapted to connect the user device to the network, and thus to connect the user device to the local device. The network interface 410 for instance physically transmits requests for accessing a remote web service and physically receives response to the request. In a variant, the network interface 410 is a wired interface such as Ethernet. The processor 420 is adapted to execute instructions implementing the software module called web browser. The web browser is adapted to run a web application. Only the features necessary for the comprehension of the invention are detailed hereafter. The web application sends request through the network interface 410 for accessing a web service by addressing a generic name that identifies any device hosting the web service. The web application receives, through the network interface 410, a response to the request comprising a global name that uniquely identifying a local device hosting the web service and which the user device can securely access. The web application verifies that the received global name is comprised in a list comprising global names of devices being trusted for hosting the web service. Advantageously the list is stored in memory 430. The web application establishes a connection, through the network interface 410, to the local device by addressing the global name and the browser verifies the received certificate associated to the global name of the local device. Thus the web application securely accesses the web service. In a variant, the secure functions are implemented in a piece of hardware, such as a secure processor.

The description is focussed on upload to web application however the invention is compatible with mechanisms wherein a web service is locally served.

Each feature disclosed in the description and (where appropriate) the claims and drawings may be provided independently or in any appropriate combination. Features described as being implemented in software may also be implemented in hardware, and vice versa. Reference numerals appearing in the claims are by way of illustration only and shall have no limiting effect on the scope of the claims.

The invention claimed is:

1. A method for securely accessing a web service by a web application running in a browser on a user device through a network, wherein
   said web service is hosted by a local device accessed by the user device, using processing circuitry, via a local area network;
   said local device is delivered, by a trusted operator, a fully qualified name that uniquely identifies said local device and a certificate associated to said fully qualified name, the fully qualified name being associated with an IP address of the local device;
   the method comprising:
   sending by the user device to the network a request for accessing said web service by addressing a generic name that identifies any device hosting said web service;
   receiving from the network by the user device a response to said request, said response comprising said fully qualified name identifying said local device hosting said web service;
   when said fully qualified name is comprised in a list, connecting, by the user device, the web application to said local device by addressing said fully qualified name, wherein the list is dynamically obtained from said trusted operator by said web application running in the browser on the user device prior to the sending of the request;
   receiving, by the user device, said certificate from said local device;
   and when said certificate associated to said fully qualified name is verified by the browser, securely accessing said web service.

2. The method according to claim 1 wherein said list comprises fully qualified names of devices being trusted for hosting said web service.

3. The method according to claim 1, wherein said list is hard coded in said web application running in the browser.

4. The method according to claim 1 wherein connecting to said local device by addressing said fully qualified name further comprises
   sending by the user device to an external network a second request for accessing said web service by addressing a fully qualified name; and
   receiving by the user device from the network a response to said second request, said response comprising a local IP address of the local device.

5. The method according to claim 4 further comprising publishing, by the local device, the local IP address of the local device associated with the fully qualified name on said trusted operator.

6. The method according to claim 4 wherein a mapping between the local IP address of the local device and the fully qualified name is maintained by a DNS service run by said trusted operator.

7. The method according to claim 1, wherein said request for accessing said web service by addressing a generic name is a HTTP request.

8. The method according to claim 1, wherein a request for securely accessing the web service by addressing said fully qualified name is a HTTPS request.

9. The method according to claim 1 wherein the local device is a gateway.

10. The method of claim 1, wherein the list further comprises a pattern matching scheme.

11. A device for securely accessing a web service by a web application running in a browser on the device, the device comprising:
    a memory;
    at least one processor coupled to the memory, the at least one processor being configured to:
    send a request, using processing circuitry, for accessing a web service by addressing a generic name that identifies any device hosting said web service, the web service being hosted by a local device on a local area network, said local device being delivered, by a trusted operator, a fully qualified name that uniquely identifies said local device and a certificate associated to said fully qualified name, the fully qualified name being associated with an IP address of the local device;
    receive a response to said request, said response comprising said fully qualified name identifying said local device hosting said web service;
    when said fully qualified name is comprised in a list, connect the web application to said local device by addressing said fully qualified name, wherein the list is dynamically obtained from said trusted operator by said web application running in the browser on the device prior to the sending of the request;
    receive said certificate from said local device; and
    when said certificate associated to said fully qualified name is verified by the browser, securely access said web service.

12. The device according to claim 11, wherein said list comprises fully qualified names of devices being trusted for hosting said web service.

13. The device according to claim 11, wherein said list is hard coded in said web application running in the browser.

14. The device according to claim 11, wherein to connect to said local device by addressing said fully qualified name, the at least one processor is configured to:
   send a second request for accessing said web service by addressing a fully qualified name; and
   receiving a response to said second request, said response comprising a local IP address of the local device.

15. The device according to claim 14, further comprising publishing, by the local device, the local IP address of the local device associated the fully qualified name on a trusted operator.

16. The device according to claim 15, wherein a mapping between the local IP address of the local device and the fully qualified name is maintained by a DNS service run by said trusted operator.

17. The device according to claim 11, wherein said request for accessing said web service by addressing a generic name is a HTTP request.

18. The device according to claim 11, wherein a request for securely accessing the web service by addressing said fully qualified name is a HTTPS request.

19. The device according to claim 11, wherein the local device is a gateway.

20. A server device comprising:
   a memory;
   processing circuitry configured to:
      receive from a web application via a network a request for accessing a web service by addressing a generic name that identifies any local device hosting said web service;
      send to the web application via the network a response to said request comprising a fully qualified name uniquely identifying said local device hosting said web service, the fully qualified name being associated with an IP address of the local device the fully qualified name being delivered by a trusted operator;
      connect to said local device by addressing said fully qualified name in case said received fully qualified name is comprised in a list, wherein the list is dynamically obtained from said trusted operator prior to the receiving of the request;
      receive a certificate from said local device; and
      securely access said web service in case said certificate associated to said fully qualified name is verified by a browser.

21. A non-transitory computer readable medium with instructions stored therein which upon execution instruct at least one processor to:
   send, using processing circuitry, via a network a request for accessing a web service by addressing a generic name that identifies any local device hosting said web service;
   receive from the network a response to said request comprising a fully qualified name uniquely identifying said local device hosting said web service, the fully qualified name being associated with an IP address of the local device, the fully qualified name and the certificate associated to the fully qualified name being provided by a trusted operator;
   connect to said local device by addressing said fully qualified name, when said received fully qualified name is comprised in a list, wherein the list is dynamically obtained from said trusted operator prior to the sending of the request;
   receive a certificate from said local device; and
   securely access said web service in case said certificate associated to said fully qualified name is verified by a browser.

* * * * *